(12) United States Patent
Ohashi

(10) Patent No.: US 8,302,646 B2
(45) Date of Patent: Nov. 6, 2012

(54) PNEUMATIC TIRE

(75) Inventor: Toshiyuki Ohashi, Osaka-fu (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 364 days.

(21) Appl. No.: 12/676,606

(22) PCT Filed: Jun. 18, 2008

(86) PCT No.: PCT/JP2008/061096
§ 371 (c)(1),
(2), (4) Date: Mar. 5, 2010

(87) PCT Pub. No.: WO2009/044572
PCT Pub. Date: Apr. 9, 2009

(65) Prior Publication Data
US 2010/0288408 A1    Nov. 18, 2010

(30) Foreign Application Priority Data
Oct. 1, 2007    (JP) .................................. 2007-257675

(51) Int. Cl.
*B60C 11/12* (2006.01)
(52) U.S. Cl. .......... 152/209.18; 152/209.19; 152/DIG. 3
(58) Field of Classification Search ............. 152/209.18, 152/209.19, 209.23, DIG. 3
See application file for complete search history.

(56) References Cited

U.S. PATENT DOCUMENTS

| 4,994,126 A | 2/1991 | Lagnier |
| 5,095,963 A * | 3/1992 | Maitre ...................... 152/209.18 |
| 6,484,772 B1 | 11/2002 | De Labareyre et al. |
| 7,143,799 B2 * | 12/2006 | Collette et al. ........... 152/209.21 |
| 7,543,617 B2 * | 6/2009 | Matsumoto .............. 152/209.21 |

FOREIGN PATENT DOCUMENTS

| JP | 2-227306 | | 9/1990 |
| JP | 6-183217 | * | 7/1994 |
| JP | 08-58317 | | 3/1996 |
| JP | 10-315711 | | 12/1998 |
| JP | 11-151914 | | 6/1999 |
| JP | 2000-211322 | | 8/2000 |
| JP | 2001-511733 | | 8/2001 |

* cited by examiner

*Primary Examiner* — Justin Fischer
*Assistant Examiner* — Robert Dye
(74) *Attorney, Agent, or Firm* — Fish & Richardson P.C.

(57) ABSTRACT

A pneumatic tire with improved steering stability without raising air columnar resonance noise level is provided. The pneumatic tire comprises upper thin grooves 11a extending from a branch point 21 in the depth direction of a main groove on the tread surface side and a plurality of lower thin grooves 11b extending from the branch point 21 in the depth direction of the main groove on the groove bottom side, which are formed at intervals along the tire circumferential direction R in a sidewall of the main groove and a distance B from the groove bottom of the main groove 1 to the branch point 21 is 30 to 60% of the depth D of the main groove 1.

2 Claims, 3 Drawing Sheets

PNEUMATIC TIRE

TECHNICAL FIELD

The present invention relates to a pneumatic tire with improved steering stability without raising air columnar resonance noise level.

This application claims benefit of priority based on Japanese Patent Application No. 2007-257675 filed on Oct. 1, 2007, the entire same contents of which are incorporated by reference herein.

BACKGROUND ART

In a state where a tire contacts the ground, tubular space is formed by a main groove extending in the tire circumferential direction and road surface. The rotation of tires lets air compressed in the tubular space to release outside, and as a result, air columnar resonance noise is generated. Since the air columnar resonance noise is offensive noise whose frequency is around 1 kHz, reduction in air columnar resonance noise has been demanded conventionally. For example, the pneumatic tire disclosed in the patent document 1 has a great number of oblong holes extending in the depth direction of a main groove formed in a sidewall of the main groove. By the oblong holes, friction resistance against the air flow in the main groove is increased, resulting in reduction in air columnar resonance noise.

Patent Document 1: Unexamined Japanese Laid-Open Patent Publication No. 10-315711 (FIG. 1)

DISCLOSURE OF THE INVENTION

Problem to be Solved by the Invention

If the pneumatic tire of the patent document 1 is used, it is necessary to increase friction resistance against the air flow in a main groove by forming many oblong holes in a sidewall of the main groove in order to reduce air columnar resonance noise effectively. However, since the oblong holes extend linearly in the depth direction of the main groove, each space between the oblong holes becomes narrow, thereby decreasing the rigidity of land part (such as blocks or ribs). As a result, particularly dry steering stability in early wear may be impaired.

On the other hand, when the space between the oblong holes is made wider in order to ensure the dry steering stability, air columnar resonance noise can not be effectively reduced and drainage effect provided by the oblong holes is also lowered. As a result, wet steering stability may be impaired.

The object of the present invention is to provide a pneumatic tire with improved steering stability without raising the level of air columnar resonance noise.

Means for Solving the Problems

The pneumatic tire of the present invention has main grooves extending in the tire circumferential direction formed on a tread. The pneumatic tire is characterized in that thin grooves that comprise one upper thin groove extending from a branch point in the depth direction of the main groove on the tread surface side and a plurality of lower thin grooves extending from the branch point in the depth direction of the main groove on the groove bottom side are formed at intervals along the tire circumferential direction in a sidewall of the main groove, and in that a distance B from the groove bottom of said main groove to said branch point is 30 to 60% of a depth D of said main groove.

Friction resistance against the air flow in the main groove is increased by the thin grooves formed in the sidewall of the main groove, and therefore air columnar resonance noise is reduced. Furthermore, the thin grooves is configured such that the number of upper thin grooves on the tread surface side is less than that of lower thin grooves on the groove bottom side with the branch point serving as a boundary. As a result, in the initial period of wear, dry steering stability is improved without excessively lowering the rigidity of a land part. After the middle period of wear, since there are many lower thin grooves provided, drainage performance is improved, thereby improving wet steering stability. In addition, since the rigidity of the land part is higher with the progress of wear, the steering stability can be ensured without excessively lowering the rigidity of the land part even if many lower thin grooves are provided.

DESCRIPTION OF THE REFERENCE NUMERALS

| | |
|---|---|
| 1 | main groove |
| 2 | block |
| 3 | sidewall of main groove |
| 11 | thin groove |
| 21 | branch point |

BEST MODE FOR CARRYING OUT THE INVENTION

Figure 1:
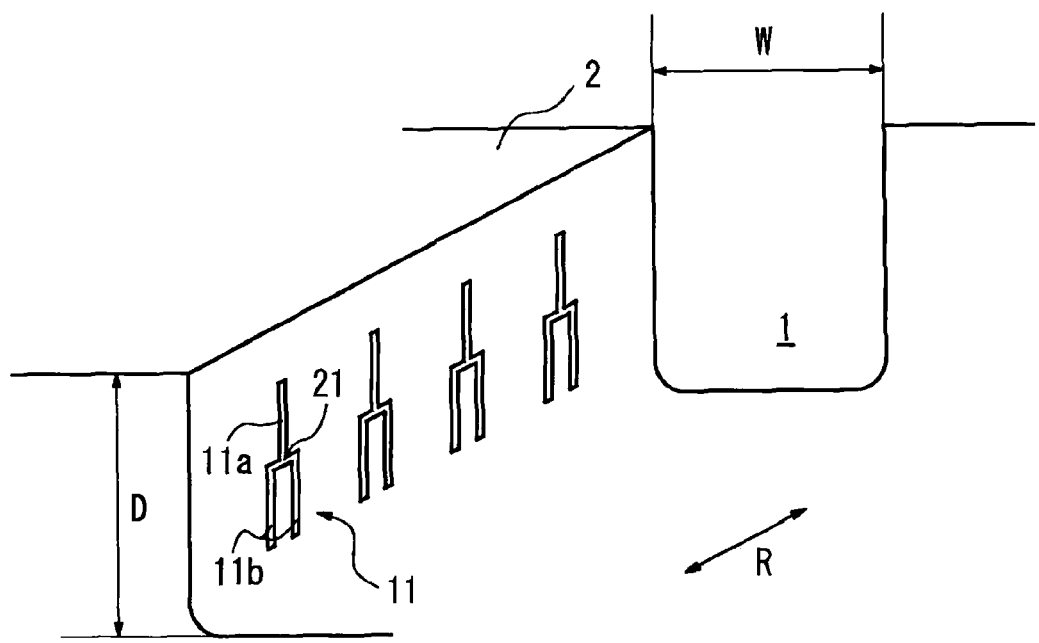
FIG. 1 is a view showing part of the main groove in the pneumatic tire related to the present invention.
Figure 2:
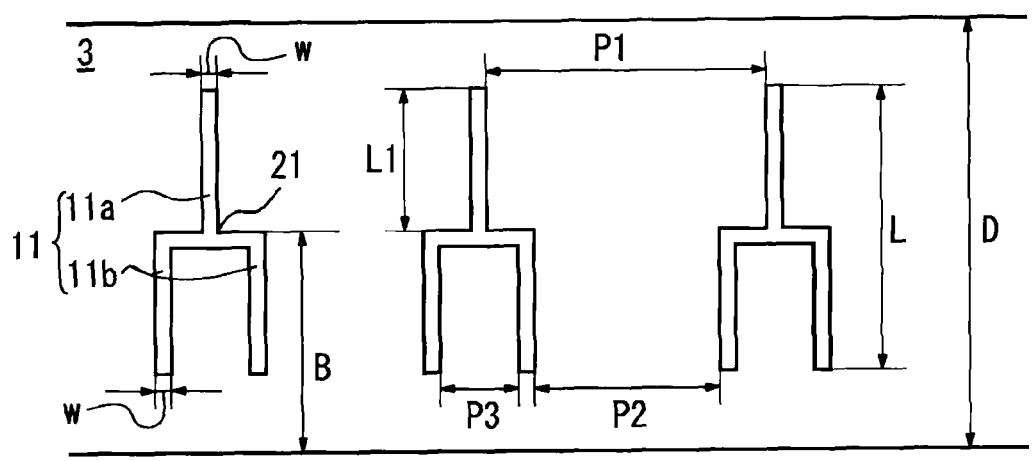
FIG. 2 is a view showing a sidewall of the main groove in the pneumatic tire related to the present invention.

Hereinafter, the embodiments for carrying out the pneumatic tire of the present invention are described with reference to drawings. FIGS. 1 and 2 are views showing a sidewall of a main groove in the pneumatic tire related to the present invention. A main groove 1 extends in the tire circumferential direction R and forms a block 2 together with a transverse groove (not illustrated). In a sidewall 3 of the main groove 1, thin grooves 11 are formed. In a sidewall opposed to the main groove 1 (not illustrated), the thin grooves 11 are also formed as well. It is noted that this shows an example of the tire with blocks formed on a tread, but the same effect can be obtained even with a tire having the thin grooves 11 formed in a sidewall of the main groove, where ribs are formed.

Each of the thin grooves 11 is configured by one upper thin groove 11a from a branch point 21 on the tread surface side and a plurality of (two in the figure) lower thin grooves 11b from the branch point 21 on the groove bottom side. The thin groove 11a and the thin grooves 11b are joined at the branch point 21. The thin grooves 11 are formed at intervals along the tire circumferential direction. The thin grooves 11 provide friction resistance against the air flow in the main groove 1 and therefore air columnar resonance noise can be reduced. It is noted that since an end portion of the upper thin groove 11a on the tread side terminates inside the sidewall 3 without opening onto the tread surface, higher friction resistance against the air flow can be provided, thereby reducing air columnar resonance noise effectively.

The thin grooves 11 are each configured such that with the branch point 21 serving as a boundary, the number of thin grooves 11a on the tread surface side is less than that of lower thin grooves 11b on the groove bottom side. As a result, in the initial period of wear, dry steering stability is improved without excessively lowering the rigidity of the block 2.

Since once the tread becomes worn beyond the branch point 21 (after the middle period of wear), the height of the block 2 is lowered, thereby enhancing the rigidity of the block 2. This enables to ensure the steering stability without excessively lowering the rigidity of the block 2 even if many thin grooves 11b are provided therein. Rather, since many lower thin grooves 11b are provided therein, the lower thin grooves 11b appear on the tread surface to improve drainage performance, thereby improving wet steering stability.

In order to improve the draining property, the upper thin groove 11a and the lower thin grooves 11b are joined together. Therefore, unless the upper thin groove 11a and the lower thin grooves 11b are joined at the branch point 21, the draining property is decreased.

It is noted that a distance B from the groove bottom of the main groove 1 to the branch point 21 is preferably 30 to 60% of the depth D of the main groove 1. When the distance B is less than 30% of the depth D of the main groove 1, the thin grooves 11b appear lately and wet steering stability after the middle period of wear can not be sufficiently improved. On the other hand, when the distance B exceeds 60% of the depth D of the main groove 1, the rigidity of the block 2 in the initial period of wear becomes too low and then dry steering stability is impaired.

It is preferred that a height L of the thin grooves 11 in the depth direction of the main groove 1 is 50 to 80% of the depth D of the main groove 1. When the height L is less than 50% of the depth D of the main groove 1, the effect of reducing air columnar resonance noise becomes small. On the other hand, when the height L exceeds 80% of the depth D, the upper thin groove 11a appears on the tread surface from the initial stage of wear, which causes the rigidity of the block 2 to become too low, and therefore it is impossible to ensure the steering stability.

It is preferred that a length L1 of the upper thin groove 11a is 25 to 40% of the depth D of the main groove 1 so that the branch point 21 is positioned about 50% of the depth D of the main groove 1 from the groove bottom. When the length L1 deviates from this range, the rigidity of the block 2 in the initial wear period of the block 2 becomes too low, which may impair the steering stability.

It is preferred that a transverse depth d of the thin groove 11 is 0.5 to 1.0 mm and a width w of the thin groove is 0.3 to 1.0 mm. If the width of the thin groove 11 is narrow or the depth thereof is shallow, the effect of reducing air columnar resonance noise may become small. If the width of the thin groove 11 is wide or the depth thereof is deep, the rigidity of the block 2 becomes too low, which may decrease steering stability.

It is preferred that a space P1 between the upper thin grooves 11a is 1.5 to 2.0 mm, a space P2 between the lower thin grooves 11b of different thin grooves 11 is 0.5 to 1.5 mm. When the spaces P1 and P2 are narrow, a portion sandwiched by the thin grooves 11a and 11b is susceptible to damage, for example, tearing off. On the other hand, if the spaces P1 and P2 are wide, the number of the thin grooves 11 is decreased and then the effect of reducing air columnar resonance noise may be lessened. For the same reason, it is preferred that a space P3 between the lower thin grooves 11b of the same thin groove 11 is 0.5 to 1.5 mm. Therefore, the space is preferably in the range of the space above P3 event though there may be three or more lower thin grooves 11b.

Figure 3:
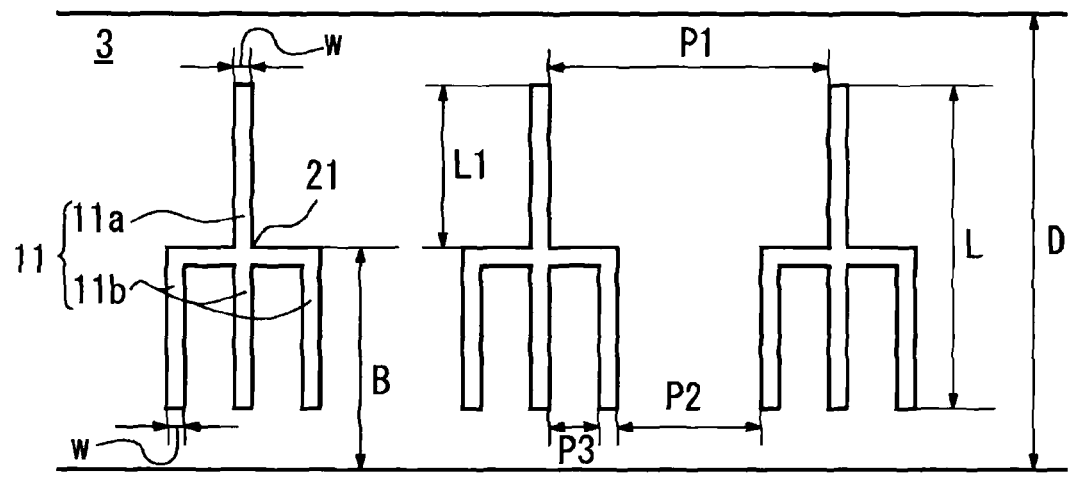
FIG. 3 is a view showing an example of thin grooves.
Figure 4:
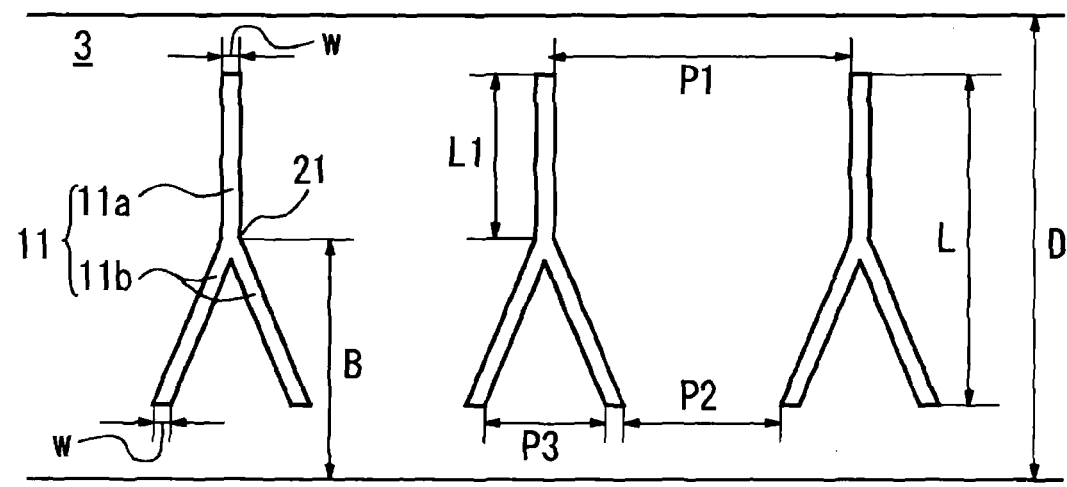
FIG. 4 is a view showing an example of thin grooves.
Figure 5:
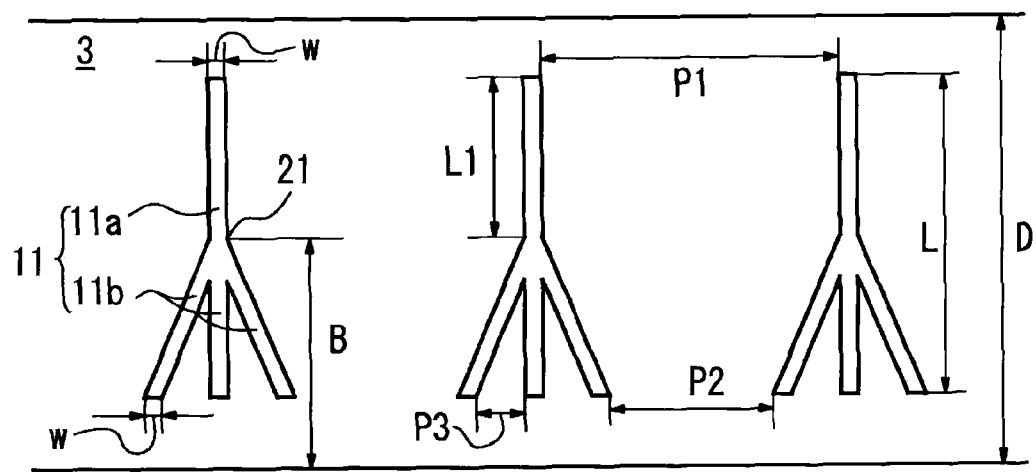
FIG. 5 is a view showing an example of thin grooves.

Therefore, the thin grooves 11 may be in the forms as shown in FIGS. 3 to 5. FIG. 3 is an example of thin grooves having three of the lower thin grooves 11b. FIGS. 4 and 5 show that each lower thin groove 11b consists of two or three thin grooves, but the lower thin grooves 11b on both sides extend diagonally to the depth direction of the main groove 1. In any examples, each dimension of the lower thin grooves 11 is preferably in the range as described above.

Example

Tires of Example according to the present invention and Comparative examples were manufactured and evaluated, respectively. Evaluation was made on the tire which has a size of 195/65R15 and a tread pattern comprising five rows of blocks of square shape whose one side is 30 mm formed by main grooves and transverse grooves each having 10 mm in width, and which is mounted to the rim having a rim size of 15×6J.

The tires comprising thin grooves as shown in FIGS. 1 and 2 were used in Examples. The tire of Comparative example 1 was provided with unbranched thin grooves (whose width w is 0.5 mm, transverse depth d is 0.5 mm, length L is 6.0 mm and space is 1.1 mm) extending in the depth direction of the main groove 1. In Comparative example 2, the tire comprising upper thin grooves and lower thin grooves having the same dimension as Examples and which are not joined together was used. Each dimension of the thin grooves was as shown in Table 1.

Evaluation results are shown in FIG. 1. Dry steering stability and wet steering stability were the values obtained by sensory evaluation on steering stability when traveling on a dry road or a wet road with tires mounted on a 1500 cc front-wheel-drive car at the time of being brand-new and wear (when the tire wears 50% of the main groove depth). The values are presented in indices with comparative example 1 set as 100. As the number becomes larger, it shows that the tire has better steering stability.

The noise level is obtained by measurement on air columnar resonance noise level at ⅓ octave-band 1 kHz by a bench test according to JASO-C606 (at the velocity of 50 km/h). The measured values were given by decibel value based on Comparative example 1. It shows that as the number becomes larger, the more noise level can be reduced.

TABLE 1

| | | Example | Comparative Example 1 | Comparative Example 2 |
|---|---|---|---|---|
| Dimension of thin groove (mm) | Position of branch point B (mm) | 4.5 | — | 4.5 |
| | Width w (mm) | 0.5 | — | 0.5 |
| | Depth d (mm) | 0.5 | — | 0.5 |
| | Thin groove length L (mm) | 7.0 | — | 7.0 |
| | Length of upper thin groove L1 (mm) | 3.5 | — | 3.5 |
| | Space P1 (mm) | 1.9 | — | 1.9 |
| | Space P2 (mm) | 0.7 | — | 0.7 |
| | Space P3 (mm) | 0.6 | — | 0.6 |
| Dry steering stability (when tire is brand-new) | | 105 | 100 | 106 |
| Dry steering stability (when tire | | 100 | 100 | 100 |

TABLE 1-continued

|  | Example | Comparative Example 1 | Comparative Example 2 |
|---|---|---|---|
| is worn) | | | |
| Wet steering stability (when tire is brand-new) | 100 | 100 | 98 |
| Wet steering stability (when tire is worn) | 107 | 100 | 107 |
| Noise level (dB) | 0 | — | 0 |

Depth of main groove D: 9 mm
Width of main groove W: 10 mm

According to Table 1, the tire of Example has improved steering stability without raising air columnar resonance noise level. On the other hand, the tire of Comparative example 2 in which the upper thin groove and the lower thin grooves were not joined together provides reduced draining property, thereby being unable to improve wet steering stability when the tire is brand-new.

What is claimed is:

1. A pneumatic tire with main grooves extending in the tire circumferential direction formed on a tread, wherein
thin grooves each comprising one upper thin groove extending from a branch point in the depth direction of the main groove on the tread surface side and a plurality of lower thin grooves extending from the branch point in the depth direction of the main groove on the groove bottom side are formed at intervals along the tire circumferential direction in a sidewall of the main groove,
a distance B from the groove bottom of said main groove to said branch point is 30 to 60% of a depth D of said main groove,
a height L of said thin grooves in the depth direction of the main groove is 50 to 80% of the depth D of said main groove and a length L1 of said upper thin groove is 25 to 40% of the depth D of said main groove, and
a transverse depth d of said thin grooves is 0.5 to 1.0 mm, a width w thereof is 0.3 to 1.0 mm, a space P1 between upper thin grooves of adjacent thin grooves is 1.5 to 3.0 mm and a space P2 between said lower thin grooves of different thin grooves is 0.5 to 2.0 mm.

2. A pneumatic tire with main grooves extending in the tire circumferential direction formed on a tread, wherein
thin grooves each comprising one upper thin groove extending from a branch point in the depth direction of the main groove on the tread surface side and a plurality of lower thin grooves extending from the branch point in the depth direction of the main groove on the groove bottom side are formed at intervals along the tire circumferential direction in a sidewall of the main groove,
a distance B from the groove bottom of said main groove to said branch point is 30 to 60% of a depth D of said main groove, and
a transverse depth d of said thin grooves is 0.5 to 1.0 mm, a width w thereof is 0.3 to 1.0 mm, a space P1 between upper thin grooves of adjacent thin grooves is 1.5 to 3.0 mm and a space P2 between said lower thin grooves of different thin grooves is 0.5 to 2.0 mm.

* * * * *